United States Patent
Yanagida et al.

(10) Patent No.: US 7,718,560 B2
(45) Date of Patent: *May 18, 2010

(54) ELECTRONIC DEVICE, DIELECTRIC CERAMIC COMPOSITION AND THE PRODUCTION METHOD

(75) Inventors: Miyuki Yanagida, Narita (JP); Akira Sato, Inba-gun (JP)

(73) Assignee: TDK Corporation, Tokyo (JP)

( * ) Notice: Subject to any disclaimer, the term of this patent is extended or adjusted under 35 U.S.C. 154(b) by 170 days.

This patent is subject to a terminal disclaimer.

(21) Appl. No.: 11/808,548

(22) Filed: Jun. 11, 2007

(65) Prior Publication Data

US 2007/0287625 A1    Dec. 13, 2007

(30) Foreign Application Priority Data

Jun. 12, 2006  (JP) ............................. 2006-162794

(51) Int. Cl.
*C04B 35/468* (2006.01)

(52) U.S. Cl. ...................................... 501/139

(58) Field of Classification Search .................. 501/139
See application file for complete search history.

(56) References Cited

U.S. PATENT DOCUMENTS

| | | | |
|---|---|---|---|
| 6,346,497 B1 | 2/2002 | Nakamura et al. | |
| 6,544,916 B1 * | 4/2003 | Sato et al. .................... | 501/137 |
| 6,645,895 B2 | 11/2003 | Sato et al. | |
| 6,800,270 B2 | 10/2004 | Nomura et al. | |
| 6,809,052 B2 | 10/2004 | Horie et al. | |
| 7,399,724 B2 * | 7/2008 | Yanagida et al. ............ | 501/139 |
| 2007/0225154 A1 * | 9/2007 | Yanagida et al. ............ | 501/139 |
| 2007/0284792 A1 * | 12/2007 | Yanagida et al. ............ | 264/614 |
| 2008/0004172 A1 * | 1/2008 | Kojima et al. ............... | 501/139 |

FOREIGN PATENT DOCUMENTS

| | | |
|---|---|---|
| EP | 1 138 652 A1 | 10/2001 |
| EP | 1 186 578 A2 | 3/2002 |
| EP | 1 327 616 A2 | 7/2003 |
| JP | A 8-124785 | 5/1996 |
| JP | A 2000-281341 | 10/2000 |
| JP | A 2000-348961 | 12/2000 |
| JP | A-2002-080279 | 3/2002 |
| JP | A 2003-176180 | 6/2003 |
| JP | A 2005-29423 | 2/2005 |
| JP | A 2006-169004 | 6/2006 |
| JP | A 2006-169005 | 6/2006 |
| JP | A 2006-169006 | 6/2006 |
| KR | 2000-23492 | 4/2000 |

OTHER PUBLICATIONS

U.S. Appl. No. 11/725,484, filed Mar. 20, 2007 in the name of Miyuki Yanagida et al.
Extended European Search report, dated Oct. 6, 2009, in European Application No. 07 11 0075.

* cited by examiner

*Primary Examiner*—Karl E Group
(74) *Attorney, Agent, or Firm*—Oliff & Berridge, PLC (57) ABSTRACT

A production method of a dielectric ceramic composition comprising a main component including a compound having a perovskite-type crystal structure expressed by a composition formula $(Ba_{1-x}Ca_x)(Ti_{1-y}Zr_y)O_3$ (note that $0 \leq x \leq 0.2$, $0 \leq y \leq 0.2$), and a fourth subcomponent including an oxide of R (note that R is at least one selected from Y, La, Ce, Pr, Nd, Pm, Sm, Eu, Gd, Tb, Dy, Ho, Er, Tm, Yb and Lu); comprising steps of obtaining a post-reaction material by bringing a material of the main component to react in advance with a part of a material of the fourth subcomponent to be included in the dielectric ceramic composition, and adding rest of material of the fourth subcomponent to be included in the dielectric ceramic composition into the post-reaction material. According to the present invention, both of a dielectric ceramic composition capable of improving the specific permittivity and a temperature characteristic of capacitance can be preferable, and the production method can be provided.

8 Claims, 1 Drawing Sheet

FIG.1

ELECTRONIC DEVICE, DIELECTRIC CERAMIC COMPOSITION AND THE PRODUCTION METHOD

BACKGROUND OF THE INVENTION

1. Field of the Invention

The present invention relates to a dielectric ceramic composition used as a dielectric layer of an electronic device, such as a multilayer ceramic capacitor, a production method thereof and an electronic device comprised of the dielectric ceramic composition as a dielectric layer.

2. Description of the Related Art

A multilayer ceramic capacitor as an example of electronic devices is produced, for example, by printing internal electrodes in a predetermined pattern on a ceramic green sheet formed by a predetermined dielectric ceramic composition, alternately stacking the results to form as one body, and co-firing a thus obtained green chip. Since internal electrode layers of the multilayer ceramic capacitor are formed to be one body with ceramic dielectric by firing, materials not reacting with the ceramic dielectric have to be selected. Therefore, in the related art, it has been necessary to use expensive precious metals, such as platinum and palladium, as the material composing the internal electrode layer.

In recent years, however, dielectric ceramic compositions using inexpensive base metals, such as nickel and copper, have been developed and a drastic reduction of costs has been realized.

Also, in recent years, demands for downsizing of electronic devices have become stronger along with electronic circuits becoming higher in density, and multilayer ceramic capacitors have rapidly become downsized with a larger capacity. To attain a downsized multilayer ceramic capacitor with a larger capacity, a method of making dielectric layers thinner and a method of heightening specific permittivity of a dielectric ceramic composition included in dielectric layers, etc. have been generally used. However, when dielectric layers are made thin, an electric field imposed on the dielectric layers becomes stronger at the time of applying a direct current voltage, consequently, there has been a disadvantage that a change of the specific permittivity with time, that is, a change of the capacity with time becomes remarkably large.

To improve a change of the capacity with time under a direct current electric field, there has been proposed a method of using dielectric particles having a small average crystal grain diameter as dielectric particles to be included in the dielectric layers (for example, refer to the Japanese Unexamined Patent Publication No. H08-124785). The Japanese Unexamined Patent Publication No. H08-124785 discloses a dielectric ceramic composition having a specific composition, wherein an average crystal grain diameter of the dielectric particles is 0.45 μm or smaller. However, the dielectric ceramic composition described in the article has too low specific permittivity to respond to downsizing and obtaining of a larger capacity.

Also, the present inventors have disclosed an electronic device in the Japanese Unexamined Patent Publication No. 2005-29423, such as a multilayer ceramic capacitor, having improved specific permittivity and accelerated lifetime of insulation resistance (IR) by dividing rare earth elements to two groups based on a value of effective ionic radius for coordination number 9, setting an adding quantity of elements belonging to one group and an adding quantity of elements belonging to the other group to be in a specific range, and setting a ratio of the adding quantities to be in a specific range.

However, along with rapid downsizing of electronic devices, multilayer ceramic capacitors are also required to be furthermore downsized and to have a larger capacity. As explained above, as a method of downsizing a multilayer ceramic capacitor and increasing the capacity, a method of making the dielectric layers thinner and a method of improving the specific permittivity are used. When making the dielectric layers thinner, a change of specific permittivity with time and other characteristics (a temperature characteristic of capacitance and IR accelerated lifetime, etc.) are required to be equivalent to those before making the layers thinner or even improved. Accordingly, to attain downsizing of a multilayer ceramic capacitor and to increase the capacity, the dielectric layers are required to be thinner while maintaining various characteristics (a change of specific permittivity with time, a temperature characteristic of capacitance and an IR accelerated lifetime, etc.) and to improve the specific permittivity.

Also, due to the variety of applications for multilayer ceramic capacitors, a wide range of characteristics is required as well. Therefore, for a main component of a dielectric ceramic composition constituting a dielectric layer, compositional design is also required to meet required specific characteristics in addition to keeping superior characteristics. However, in the Japanese Unexamined Patent Publication No. 2005-29423, the main component of a dielectric ceramic composition is limited to barium titanate, it is liable to have little flexibility to obtain characteristics according to application.

SUMMARY OF THE INVENTION

An object of the present invention is to provide a dielectric ceramic composition, capable of making dielectric layers thin, of exhibiting high specific permittivity and a preferable temperature characteristic of capacitance, and of improving reliability even when the main component of the dielectric ceramic composition varies, and the production method thereof. Another object of the present invention is to provide an electronic device, such as a multilayer ceramic capacitor, having a dielectric layer composed of a dielectric ceramic composition as such.

The present inventors have found that it is possible to obtain dielectric ceramic composition having a high specific permittivity and preferable temperature characteristic of capacitance as well as preferable other characteristics by using a specific method for adding oxides of rare earth element added as subcomponents even when making the dielectric layers thinner and selecting a main component from a variety of compounds having a perovskite-type crystal structure. Also, the present inventors have found that the above effects could be furthermore enhanced by dividing the above rare earth elements to two groups based on a value of effective ionic radius for coordination number 9, by using a specific method for adding oxides of elements selected from one or both of the two groups, and by setting a ratio of number of moles of elements belonging to one group and number of moles of elements belonging to the other group in the two groups to be in a specific range in the finally obtained dielectric ceramic composition, and completed the present invention.

Namely, according to the first aspect of the present invention, there is provided a production method of a dielectric ceramic composition comprising a main component including a compound having a perovskite-type crystal structure expressed by a composition formula $(Ba_{1-x}Ca_x)(Ti_{1-y}Zr_y)O_3$ (note that $0 \leq x \leq 0.2$, $0 \leq y \leq 0.2$), and a fourth subcomponent including an oxide of R (note that R is at least one selected from Y, La, Ce, Pr, Nd, Pm, Sm, Eu, Gd, Tb, Dy, Ho, Er, Tm, Yb and Lu);

comprising steps of:

obtaining a post-reaction material by reacting a material of the main component in advance with a part of a material of the fourth subcomponent to be included in the dielectric ceramic composition, and adding rest of material of the fourth subcomponent to be included in the dielectric ceramic composition into the post-reaction material.

In the first aspect, it is able to obtain a post-reaction material wherein the fourth subcomponent exists at least inside of particles of the main component by reacting a material of the main component in advance with a part of a material of the fourth subcomponent.

Note that in the present invention, it is sufficient if at least the fourth subcomponent exists inside of particles of the main component in the obtained post-reaction material. Namely, for example, the fourth subcomponent may be unevenly or uniformly distributed inside of particles of the main component, and alternately, the content ratio may gradually change therein.

Then, rest of the fourth subcomponent to be included in a dielectric ceramic composition is added to the obtained post-reaction material. It results in improved specific permittivity and a preferable temperature characteristic of capacitance, and consequently, reliability can be improved even when the dielectric layers are made thinner.

In the first aspect, preferably, the material of the main component and at least a part of the material of the fourth subcomponent are dispersed as solid solution in advance, and the resulting post-reaction material is used. As a result, the fourth subcomponent can be uniformly dispersed in the main component as solid solution, and consequently, the characteristics can be furthermore improved.

In the first aspect, the word "reaction" is used based on a concept including solid dispersion and coating, etc., and includes a method for creating a state wherein the fourth subcomponent exists inside the main component.

In the first aspect, a content of the fourth subcomponent in the finally-obtained dielectric ceramic composition is preferably 0.1 to 10 moles, and more preferably 0.2 to 6 moles, when calculated as a conversion of R, with respect to 100 moles of the main component.

By setting a content of the fourth subcomponent included in the dielectric ceramic composition to be within the above range, it is possible to improve a temperature characteristic of capacitance. When a content of the fourth subcomponent is too small, the effect of adding the fourth subcomponent cannot be obtained resulting that the temperature characteristic of capacitance is liable to deteriorate. On the other hand, when too large, the sinterability is liable to decline.

In the first aspect, it is preferable that a content of the fourth subcomponent to react in advance with a material of the main component is more than 0 to 0.5 mole in terms of R with respect to 100 moles of the main component.

Alternatively, in the present invention, a ratio of the fourth subcomponent to react in advance with a material of the main component is preferably more than 0 to 50 mol %, and more preferably more than 0 to 25 mol %, in terms of R with respect to 100 mol % of a total amount of the fourth subcomponent to be finally included in the dielectric ceramic composition.

When an amount of a material of the fourth subcomponent to react in advance with the main component material is too large, a crystal grain diameter of a sintered body obtained after firing becomes too large, so that the temperature characteristic of capacitance tends to deteriorate and the insulation resistance (IR) tends to decline.

According to the second aspect, there is provided a production method of a dielectric ceramic composition comprising a main component including a compound having a perovskite-type crystal structure expressed by a composition formula $(Ba_{1-x}Ca_x)(Ti_{1-y}Zr_y)O_3$ (note that $0 \leqq x \leqq 0.2$, $0 \leqq y \leqq 0.2$), a fourth (a) subcomponent including an oxide of R1 (note that R1 is at least one selected from rare-earth elements having an effective ionic radius for coordination number 9 of less than 108 pm), and a fourth (b) subcomponent including an oxide of R2 (note that R2 is at least one selected from rare-earth elements having an effective ionic radius for coordination number 9 of 108 pm to 113 pm);

comprising steps of:

obtaining a post-reaction material by reacting a material of the main component in advance with a part of a material of the fourth (a) subcomponent and/or a part of a material of the fourth (b) subcomponent to be included in the dielectric ceramic composition; and adding rest of materials of the fourth (a) subcomponent and the fourth (b) subcomponent to be included in the dielectric ceramic composition into the post-reaction material;

wherein a ratio (M2/M1) of number of moles M2 of R2 of the fourth (b) subcomponent to number of moles M1 of R1 of the fourth (a) subcomponent in the finally-obtained dielectric ceramic composition satisfies $0 \leqq M2/M1 \leqq 0.25$.

In the second aspect, R in the first aspect is divided to R1 and R2 based on a value of effective ionic radius for coordination number 9 of an R element, a subcomponent comprised of an oxide of R1 is the fourth (a) subcomponent and a subcomponent comprised of an oxide of R2 is the fourth (b) subcomponent. By reacting a material of the main component in advance with a part of a material of the fourth (a) subcomponent and/or a part of a material of the fourth (b) subcomponent, a post-reaction material, wherein at least a part of the fourth (a) subcomponent and/or a part of the fourth (b) subcomponent exist inside of particles of the main component, can be obtained.

Note that in the second aspect, it is sufficient if at least the fourth (a) subcomponent and/or the fourth (b) subcomponent exist inside of particles of the main component in the obtained post-reaction material. Namely, in the same way as in the first aspect, for example, the fourth (a) subcomponent and/or the fourth (b) subcomponent may be unevenly or uniformly distributed inside of particles of the main component, and alternately, the content ratio may gradually change therein.

Then, the rest of the fourth (a) subcomponent material and the fourth (b) subcomponent material to be included in a dielectric ceramic composition is added to the obtained post-reaction material, and a ratio (M2/M1) of number of moles M2 of R2 of the fourth (b) subcomponent to number of moles M1 of R1 of the fourth (a) subcomponent in the finally obtained dielectric ceramic composition is set to be in the above range.

It results in improved specific permittivity and a preferable temperature characteristic of capacitance, and consequently, reliability can be improved even when the dielectric layers are made thinner.

In the second aspect, preferably, the material of the main component and a part of the material of the fourth (a) subcomponent and/or a part of the material of the fourth (b) subcomponent are dispersed as solid solution in advance. As a result, the fourth (a) subcomponent and/or the fourth (b) subcomponent can be uniformly dispersed in the main component as solid solution, and the above characteristics can be furthermore improved.

In the second aspect, the word "reaction" is used based on a concept of including solid dispersion, coating, etc., and includes a method for creating a state where the fourth (a) subcomponent and/or the fourth (b) subcomponent exists inside the main component.

In the second aspect, a content of the fourth (a) subcomponent in the finally obtained dielectric ceramic composition with respect to 100 moles of the main component is preferably more than 0 to 10 moles in terms of R1. The lower limit of the content of the fourth (a) subcomponent is more preferably 0.1 mole or larger, and furthermore preferably 0.2 mole or larger in terms of R1. The upper limit of the content of the fourth (a) subcomponent is more preferably 6 moles or smaller, and furthermore preferably 5 moles or smaller in terms of R1.

Also, a content of the fourth (b) subcomponent in the finally obtained dielectric ceramic composition with respect to 100 moles of the main component is preferably more than 0 to 2 moles, and more preferably more than 0 to 1 mole in terms of R2.

In the second aspect, by setting contents of the fourth (a) subcomponent and fourth (b) subcomponent included in the finally obtained dielectric ceramic composition to be in the above range, both of the specific permittivity and a temperature characteristic of capacitance can become preferable, and more over, other characteristics can become preferable. When a content of the fourth (a) subcomponent is too small, the effect of improving the temperature characteristic of capacitance cannot be obtained. When too large, on the other hand, the sinterability tends to decline. Also, when a content of the fourth (b) subcomponent is too small, the effects of improving the IR and IR accelerated lifetime cannot be obtained. When too large, on the other hand, the temperature characteristic of capacitance tends to deteriorate.

In the second aspect, the fourth (a) subcomponent and/or the fourth (b) subcomponent reacted in advance with a material of the main component is preferably more than 0 to 0.5 mole and more preferably more than 0 to 0.4 mole in terms of R1 and/or R2 with respect to 100 moles of the main component.

When amounts of materials of the fourth (a) subcomponent and/or the fourth (b) subcomponent reacted in advance with the main component material are too large, a crystal grain diameter of a sintered body obtained after firing becomes too large, so that the temperature characteristic of capacitance tends to deteriorate and the IR accelerated lifetime tends to decline.

In the second aspect, when assuming that an effective ionic radius for coordination number 9 of rare earth elements composing of R1 is r1 and an effective ionic radius for coordination number 9 of rare earth elements composing of R2 is r2, R1 and R2 are selected so that a ratio (r2/r1) of r1 and r2 satisfies a relationship of $1.007 < r2/r1 < 1.06$.

In the second aspect, preferably, the R1 is at least one selected from Y, Ho, Er, Tm, Yb and Lu.

In the second aspect, preferably, the R2 is at least one selected from Dy, Tb, Gd and Eu.

By setting a ratio of effective ionic radius for coordination number 9 of R1 and R2 to be in the above range and by attaining the above compositions of the R1 and R2, the effects of the present invention can be furthermore enhanced.

Note that a value of an effective ionic radius mentioned in the present specification is a value based on the article "R. D. Shannon, Acta Crystallogr., A32,751 (1976)".

In the both of the first and second aspects, preferably, the dielectric ceramic composition furthermore comprises a first subcomponent comprised of at least one selected from MgO, CaO, BaO and SrO, a second subcomponent mainly comprised of $SiO_2$ and comprised of at least one selected from MO (note that M is at least one selected from Mg, Ca, Ba and Sr), $Li_2O$ and $B_2O_3$, and a third subcomponent comprised of at least one selected from $V_2O_5$, $MoO_3$ and $WO_3$;

wherein ratios of respective subcomponents with respect to 100 moles of the main component are first subcomponent: 0.1 to 5 moles,
second subcomponent: 0.1 to 12 moles, and
third subcomponent: more than 0 to 0.3 mole.

In the both of the first and second aspects, preferably, the dielectric ceramic composition furthermore comprises a fifth subcomponent comprised of MnO and/or $Cr_2O_3$, and a ratio of the fifth subcomponent with respect to 100 moles of the main component is 0.05 to 1.0 mole.

In the first aspect, as a result that the first to third subcomponents (more preferably as well as the fifth subcomponent) are included together with the fourth subcomponent, a temperature characteristic of capacitance can be improved, and particularly, the B characteristics of the JIS standard [−25 to 85° C., ΔC=within ±10% (reference temperature 20° C.)] can be satisfied.

In the second aspect, as a result that the first to third subcomponents (more preferably as well as the fifth subcomponent) are included together with the fourth (a) and fourth (b) subcomponents, a temperature characteristic of capacitance can be improved and, particularly, the X6S characteristics of the EIA standard (−55 to 105° C., ΔC=within ±22%) can be satisfied. Note that timing of adding the first to third and fifth subcomponents is not particularly limited, but it is preferable that the first to third and fifth subcomponents are added to the post-reaction material after the reaction.

In the both of the first and second aspects, preferably, a material having an average particle diameter of 0.05 to 0.5 μm and more preferably 0.1 to 0.4 μm is used as a material of the main component. By using a main component material having an average particle diameter in the above range, an average crystal grain diameter of dielectric particles after sintering can preferably become fine as 0.1 to 0.3 μm, so that a change of the specific permittivity with time can be reduced.

A dielectric ceramic composition according to the present invention is produced by any one of the methods explained above.

An electronic device according to the present invention has a dielectric layer composed of the dielectric ceramic composition explained above. The electronic device is not particularly limited, and multilayer ceramic capacitors, piezoelectric elements, chip inductors, chip varisters, chip thermisters, chip resistors and other surface mounted (SMD) chip type electronic devices may be mentioned.

According to the present invention, there is provided a dielectric ceramic composition, having both high specific permittivity and preferable temperature characteristic of capacitance as well as preferable other characteristics (a dielectric loss, CR product, and IR) by using the above method for adding an oxide of rare earth elements as a subcomponent (the fourth subcomponent) even when selecting a main component of a dielectric ceramic composition from a variety of compounds having a perovskite-type crystal structure, and the production method thereof.

Further, the above rare earth elements are divided to R1 and R2 based on a value of effective ionic radius for coordination number 9, a subcomponent comprised of an oxide of R1 is the fourth (a) subcomponent, and a subcomponent comprised of an oxide of R2 is the fourth (b) subcomponent. By using the above method for adding oxides of elements selected from one or both of the fourth (a) subcomponent and the fourth (b) subcomponent, and by setting a ratio (M2/M1) of number of moles M2 of R2 of the fourth (b) subcomponent to number of moles M1 of R1 of the fourth (a) subcomponent to be in the above range in the finally obtained dielectric ceramic composition, the above effects can be enhanced.

BRIEF DESCRIPTION OF DRAWINGS

Below, the present invention will be explained based on an embodiment shown in a drawing.

DESCRIPTION OF THE PREFERRED EMBODIMENT

Multilayer Ceramic Capacitor 1

Figure 1:
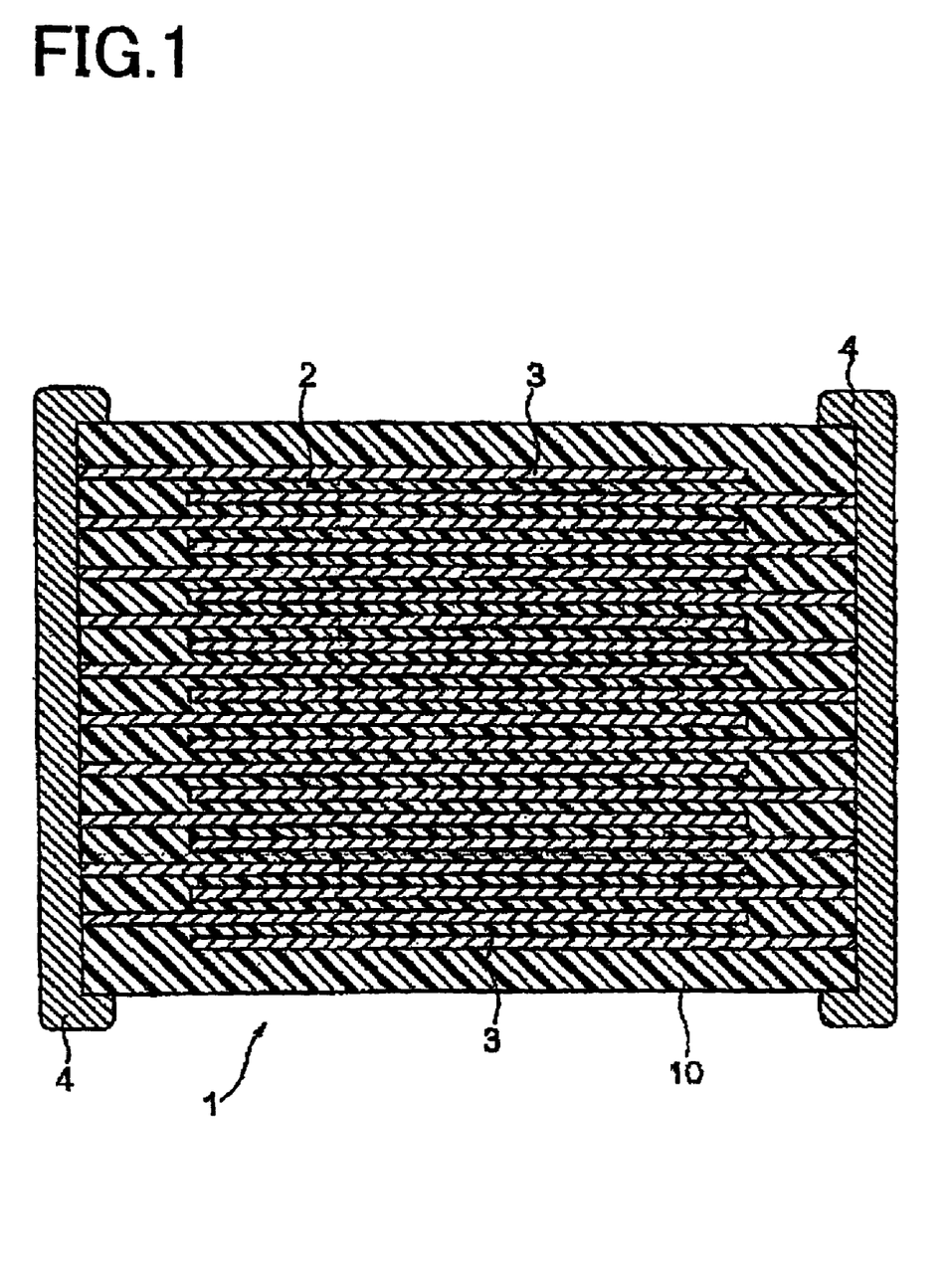
FIG. 1 is a sectional view of a multilayer ceramic capacitor according to an embodiment of the present invention.

As shown in FIG. 1, a multilayer ceramic capacitor 1 according to an embodiment of the present invention has a capacitor element body 10 configured by alternately stacking dielectric layers 2 and internal electrode layers 3. On both end portions of the capacitor element body 10, a pair of external electrodes 4 respectively conducting to the internal electrode layers 3 alternately arranged inside the element body 10 are formed. A shape of the capacitor element body 10 is not particularly limited but is normally a rectangular parallelepiped shape. Also, a size thereof is not particularly limited and may be suitably determined in accordance with application.

The internal electrode layers 3 are stacked so that respective end surfaces thereof are alternatively exposed to surfaces of two facing end portions of the capacitor element body 10. The pair of external electrodes 4 are formed on both end portions of the capacitor element body 10 and connected to the exposed end surfaces of the alternately arranged internal electrode layers 3 so as to configure a capacitor circuit.

Dielectric Layer 2

The dielectric layers 2 comprise a dielectric ceramic composition according to the first and second aspects of the present invention.

The dielectric ceramic composition according to the first aspect at least comprises a main component including a compound having a perovskite-type crystal structure expressed by a composition formula $(Ba_{1-x}Ca_x)(Ti_{1-y}Zr_y)O_3$ and a fourth subcomponent including an oxide of R (note that R is at least one selected from Y, La, Ce, Pr, Nd, Pm, Sm, Eu, Gd, Tb, Dy, Ho, Er, Tm, Yb and Lu). In this case, the oxygen (O) amount may be slightly deviated from the above stoichiometric composition.

In the first aspect, by bringing the dielectric ceramic composition to include the fourth subcomponent and by using a specific method for adding in the production method to be hereinafter described, various characteristics, particularly specific permittivity and capacity-temperature characteristic, etc., can be satisfactory. Hereinafter, the main component and the fourth subcomponent will be described in detail.

In the above formula, "x" satisfies $0 \leq x \leq 0.2$, preferably $0 \leq x \leq 0.15$, and more preferably $0 \leq x \leq 0.10$. The "x" indicates the number of Ca atoms, and by setting "x" within the above range, capacity-temperature characteristic and specific permittivity can be controlled accordingly. When the "x" is too large, specific permittivity may be declined. On the other hand, when too small, capacity-temperature characteristic may be deteriorated. Note that Ca may not be necessarily included and only Ba may be included in the present invention.

In the above formula, "y" satisfies $0 \leq y \leq 0.2$, preferably $0 \leq y \leq 0.15$, and more preferably $0 \leq y \leq 0.10$. The "y" indicates the number of Zr atoms, and by substituting with $ZrO_2$ that is less reduced than $TiO_2$ is, resistance to reduction can be further enhanced. Note that Zr may not be necessarily included and only Ti may be included in the present invention.

Also note that at least either one of "x" and "y" is preferably more than 0.

The fourth subcomponent is a subcomponent including an oxide of R. An R element of the oxide of R is at least one element selected from Y, La, Ce, Pr, Nd, Pm, Sm, Eu, Gd, Tb, Dy, Ho, Er, Tm, Yb and Lu. Among them, Y, Pm, Sm, Eu, Gd, Tb, Dy, Ho, Er, Tm, Yb and Lu are preferable and Y, Tb and Yb are more preferable.

The fourth subcomponent has an effect of improving the IR accelerated lifetime characteristics. A content of the fourth subcomponent is preferably 0.1 to 10 moles and more preferably 0.2 to 6 moles in terms of R. When the content is too small, the effect of adding the fourth subcomponent cannot be obtained, and the capacity-temperature characteristic declines. On the other hand, when the content is too large, the sinterability tends to decline. Note that, as will be explained later on, a step of reacting at least a part of a material of the fourth subcomponent in advance with a material of the main component is applied in the production method of the present embodiment.

The dielectric ceramic composition according to the second aspect at least comprises a main component including a compound having a perovskite-type crystal structure expressed by a composition formula $(Ba_{1-x}Ca_x)(Ti_{1-y}Zr_y)O_3$, a fourth (a) subcomponent including an oxide of R1 (note that R1 is at least one selected from the first element group composing rare-earth elements having an effective ionic radius for coordination number 9 of less than 108 pm), and a fourth (b) subcomponent including an oxide of R2 (note that R2 is at least one selected from the second element group composing rare-earth elements having an effective ionic radius for coordination number 9 of 108 pm to 113 pm). In this case, the oxygen (O) amount may be slightly deviated from the above stoichiometric composition.

In the second aspect, by bringing the dielectric ceramic composition to include the fourth (a) and fourth (b) subcomponents, by using a specific method for adding in the production method to be hereinafter described, and also by setting the ratio of number of moles of R1 (the fourth (a) subcomponent) and R2 (the fourth (b) subcomponent) within a specific range, various characteristics, particularly specific permittivity and IR lifetime, etc., can be satisfactory. The details on the main component are same as in the first aspect. Hereinafter, the fourth (a) and fourth (b) subcomponents will be described in detail.

The fourth (a) subcomponent, included in the fourth subcomponent, is a subcomponent comprised of an oxide of R1. R1 is at least one selected from the first element group. The first element group includes Y (107.5 pm), Ho (107.2 pm), Er (106.2 pm), Tm (105.2 pm), Yb (104.2 pm) and Lu (103.2 pm). Among them, Y, Yb and Er are preferable, and Y and Yb are more preferable.

The fourth (a) subcomponent has an effect of flattening a temperature characteristic of capacitance. A content of the fourth (a) subcomponent is preferably more than 0 to 10 moles in terms of R1. The lower limit of the content is more preferably 0.1 mole or larger and, furthermore preferably 0.2 mole or larger in terms of R1. Also, the upper limit of the content is more preferably 6 moles or smaller and, furthermore preferably 5 mole or smaller in terms of R1. When the content is too small, the effect of adding the fourth (a) subcomponent cannot be obtained, and a temperature characteristic of capacitance declines. When the content is too large, on the other hand, the sinterability tends to decline.

The fourth (b) subcomponent, included in the fourth subcomponent, is a subcomponent comprised of an oxide of R2. R2 is at least one selected from the second element group. The second element group includes Dy (108.3 pm), Tb (109.5 pm), Gd (110.7 pm) and Eu (112 pm). Among them, Tb, Gd and Eu are preferable, and Tb and Gd are more preferable.

The fourth (b) subcomponent exhibits an effect of improving IR and an IR accelerated lifetime. A content of the fourth (b) subcomponent is preferably more than 0 to 2 moles, more preferably more than 0 to 1 mole, and furthermore preferably more than 0 to 0.5 mole in terms of R2. When the content is too small, the effect of improving the IR and IR accelerated lifetime cannot be obtained. When too large, on the other hand, a temperature characteristic of capacitance tends to decline. Note that, as will be explained later on, a production method of the present embodiment has a step for reacting a part of the fourth (a) subcomponent material and/or a part of the fourth (b) subcomponent material in advance with a main component material.

In the second aspect, a ratio (M2/M1) of number of moles M1 of R1 of the fourth (a) subcomponent and number of moles M2 of R2 of the fourth (b) subcomponent satisfies $0 \leq M2/M1 \leq 0.25$, more preferably $0 \leq M2/M1 \leq 0.20$, and furthermore preferably $0 \leq M2/M1 \leq 0.15$.

In the second aspect, when assuming that a value of effective ionic radius for coordination number 9 of rare earth elements composing the first element group is r1, and that of the rare earth elements composing the second element group is r2, the first element group and the second element group are preferably composed so that a ratio (r2/r1) of r1 and r2 satisfies a relationship of $1.007 < r2/r1 < 1.06$. For example, a combination of Y (R1) and Gd (R2) may be mentioned as a preferable combination.

Preferably, the dielectric ceramic composition according to the first and second aspects furthermore includes the following first to third and fifth subcomponents.

Namely, it is preferable to furthermore include the first subcomponent comprised of at least one selected from MgO, CaO, BaO and SrO, the second subcomponent mainly comprised of $SiO_2$ and comprised of at least one selected from MO (note that M is at least one selected from Mg, Ca, Ba and Sr), $Li_2O$ and $B_2O_3$, the third subcomponent comprised of at least one selected from $V_2O_5$, $MoO_3$ and $WO_3$, and a fifth subcomponent comprised of MnO and/or $Cr_2O_3$.

Ratios of the above respective subcomponents with respect to 100 moles of the main component are in terms of each oxide, the first subcomponent: 0.1 to 5 moles,
the second subcomponent: 0.1 to 12 moles,
the third subcomponent: more than 0 to 0.3 mole, and
the fifth subcomponent: 0.05 to 1.0 mole; and more preferably,
the first subcomponent: 0.2 to 4 moles,
the second subcomponent: 0.5 to 6 moles,
the third subcomponent: more than 0 to 0.25 mole), and
the fifth subcomponent: 0.05 to 0.4 mole.

As a result that the first to third and fifth subcomponents are included in the dielectric ceramic composition according to the first aspect, a temperature characteristic of capacitance can be improved and, preferably, the B characteristics of the JIS standard (−25 to 85° C. and ΔC=within ±10%) can be satisfied.

As a result that the first to third and fifth subcomponents are included in the dielectric ceramic composition according to the second aspect, a temperature characteristic of capacitance can be improved and, preferably, the X6S characteristics of the EIA standard (−55 to 105° C. and ΔC=within ±22%) can be satisfied.

Note that, in the present specification, each oxide composing the main component and subcomponents is expressed by a stoichiometric composition, but an oxidization state of each of the oxides may be deviated from the stoichiometric composition. Note that the above ratios of the respective subcomponents are obtained by calculating as a conversion of oxides of the stoichiometric composition based on metal amounts included in the oxides composing the respective subcomponents.

The reasons of limiting contents of the respective subcomponents are as below.

When a content of the first subcomponent (MgO, CaO, BaO and SrO) is too small, a temperature change rate of the capacitance becomes large. On the other hand, when the content is too large, it is liable that the sinterability declines and that the IR accelerated lifetime deteriorates. Note that component ratios of respective oxides in the first subcomponent may be any.

The second subcomponent includes $SiO_2$ as the main component and at least one selected from MO (note that M is at least one selected from Mg, Ca, Ba and Sr), $Li_2O$ and $B_2O_3$. The second subcomponent mainly acts as a sintering aid. The first subcomponent also includes MO (note that M is at least one selected from Mg, Ca, Ba and Sr), but when MO is made to be a composite oxide with $SiO_2$ and to be a compound expressed by a composition formula $M_xSiO_{2+x}$, the melting point can be lowered. Since the melting point can be lowered, reactivity with the main component can be improved. Note that, for example, when using BaO and CaO as the MO, the composite oxide is preferably a compound expressed by a composition formula of $(Ba, Ca)_xSiO_{2+x}$. The "x" in the composition formula of $(Ba, Ca)_xSiO_{2+x}$ is preferably 0.8 to 1.2, and more preferably 0.9 to 1.1. When the "x" is too small, that is, when the content of $SiO_2$ is too large, it reacts with the main component $Ba_mTiO_{2+m}$ to deteriorate the dielectric characteristic. On the other hand, when the "x" is too large, the melting point becomes high to deteriorate the sinterability, which is unfavorable.

The third subcomponent ($V_2O_5$, $MoO_3$ and $WO_3$) exhibits an effect of flattening a temperature characteristic of capacitance at the Curie's temperature or higher and an effect of improving the IR accelerated lifetime. When a content of the third subcomponent is too small, the effects become insufficient. On the other hand, when the content is too large, the IR declines remarkably. Note that component ratios of respective oxides in the third subcomponent may be any.

The fifth subcomponent (MnO and $Cr_2O_3$) has effects of shifting the Curie's temperature to the high temperature side, flattening a temperature characteristic of capacitance, improving the insulation resistance (IR), improving the breakdown voltage and lowering the firing temperature, etc.

An average crystal grain diameter of dielectric particles included in the dielectric ceramic composition is not particularly limited, but 0.1 to 0.3 μm is preferable. When the average crystal grain diameter is too small, the specific permittivity tends to become low, while when too large, a change of specific permittivity with time tends to become large. An average crystal grain diameter of the dielectric particles, for example, can be measured by the code method for measuring an average particle diameter from a SEM image of the dielectric particles on an assumption that shapes of the dielectric particles are sphere.

A thickness of the dielectric layers 2 is not particularly limited, but 10 µm or thinner per one layer is preferable, 6 µm or thinner is more preferable, and 4.5 µm or thinner is furthermore preferable. A lower limit of the thickness is not particularly limited and is, for example, 0.5 µm or so.

The number of stacked layers of the dielectric layers 2 is not particularly limited, but 20 or larger is preferable, 50 or larger is more preferable, and 100 or larger is particularly preferable. An upper limit of the number of stacked layers is not particularly limited and is, for example, 2000 or so.

Internal Electrode Layer 3

A conductive material included in the internal electrode layers 3 is not particularly limited, but components of the dielectric layers 2 have reduction-resistance, so that relatively inexpensive base metals may be used. As base metals to be used as the conductive material, Ni or a Ni alloy is preferable. As a Ni alloy, alloys of one or more elements selected from Mn, Cr, Co and Al with Ni are preferable, and a Ni content in the alloy is preferably 95 wt % or larger. Note that Ni or a Ni alloy may include a variety of trace components, such as P, in an amount of not larger than 0.1 wt % or so. A thickness of the internal electrode layers 3 may be suitably determined in accordance with application, etc., but normally it is 0.1 to 3 µm, and particularly 0.2 to 2.0 µm or so is preferable.

External Electrode 4

A conductive material included in the external electrodes 4 is not particularly limited, and inexpensive Ni, Cu and alloys of these may be used in the present invention. A thickness of the external electrodes 4 may be suitably determined in accordance with application, etc. but normally 10 to 50 µm or so is preferable.

Production Method of Multilayer Ceramic Capacitor

A multilayer ceramic capacitor of the present embodiment is produced by producing a green chip by a normal printing method or a sheet method using paste, firing the result, printing or transferring external electrodes and firing, as with the multilayer ceramic capacitor in the related arts. Below, the production method according to the first aspect will be explained specifically.

First, a dielectric ceramic composition powder included in the dielectric layer paste is fabricated.

In the first aspect, the dielectric ceramic composition powder is fabricated as below. First, a material of the main component and a part of a material of the fourth subcomponent (a material corresponding to a part of the fourth subcomponent to be included in the dielectric ceramic composition) are reacted or preferably dispersed as solid solution in advance, so that a post-reaction material is obtained. Next, the post-reaction material is added with the rest of the fourth subcomponent material (remaining material in the fourth subcomponent for composing the dielectric ceramic composition) and the above first to third and fifth subcomponent materials. Then, calcination is performed if necessary, and a dielectric ceramic composition powder is fabricated.

As the above main component material, powders of $BaTiO_3$, $CaTiO_3$, $BaZrO_3$ and $CaZrO_3$, or compound powders to be the above oxides when fired may be used, and an average particle diameter of the main component material is preferably 0.05 to 0.5 µm, and more preferably 0.1 to 0.4 µm.

When an average particle diameter of the main component material is too large, an average crystal grain diameter of dielectric particles after sintering becomes too large, and it is liable that the temperature characteristic is deteriorated and that the insulation resistance (IR) declines. On the other hand, when the average particle diameter is too small, dispersion of oxides of R to the main component material as solid solution tends to become uneven. Note that in the present embodiment, the average particle diameter means a volume-reduced cumulative 50% diameter (D50 diameter), which can be measured by a laser diffraction method, etc. using light scattering.

As the fourth subcomponent materials reacted in advance with the main component material, the oxide of R as above and a variety of compounds to be the oxide of R when fired may be used. As the oxide of R and the compounds to be the oxide of R when fired, powder materials having an average particle diameter of 0.01 to 0.1 µm or so or sol materials mentioned below, etc. may be used.

The sol materials are not particularly limited, and for example, hydroxide sol and oxide sol, etc. may be mentioned. Also, a sol particle diameter of the sol materials is normally 1 to 100 nm or so, and as the solvent, water; methanol, ethanol and other alcohols; xylene, toluene and other aromatic solvents; methylethylketone and other ketones; and other organic based solvents may be illustrated.

The compounds to be the oxide of R when fired are not particularly limited, and alkoxide of R and inorganic acid salts of R, etc. may be illustrated. The alcoxide of R is a compound of alcohol and R element and, specifically, a compound, wherein hydrogen in a hydroxyl group of alcohol is substituted by an R element. The alcoxides of R are not particularly limited, and a variety of compounds expressed by a general formula of $C_nH_{2n+1}OR$ ("n" is an integer from 1 to 9) may be used. For example, $CH_3OR$, $C_2H_5OR$, n-$C_3H_7OR$ and i-$C_3H_7OR$, etc. may be mentioned.

The fourth subcomponent material reacted in advance with the main component material is preferably more than 0 to 0.5 mole, and more preferably 0.01 to 0.2 mole in terms of R with respect to 100 moles of the main component. Alternatively, the ratio of the fourth subcomponent material reacted in advance is preferably more than 0 to 50 mol %, more preferably more than 0 to 25 mol %, and furthermore preferably more than 0 to 15 mol % in terms of R with respect to a total of 100 mol % to be finally included in the dielectric ceramic composition.

When an amount of the fourth subcomponent material reacted in advance with the main component is too large, a crystal grain diameter of a sintered body obtained after firing becomes too large and it is liable that a temperature characteristic of capacitance declines and that the insulation resistance (IR) declines.

As a method of obtaining the post-reaction material by reacting the main component material in advance with a part of the fourth subcomponent material, a method of mixing the main component material and the fourth subcomponent material by using a solvent, etc., evaporating the solvent and performing calcination, and a method of adding a precipitant to a mixed solution, depositing the fourth subcomponent on the main component and performing calcination, etc. may be mentioned. Note that a temperature at the calcination is preferably 500 to 700° C. or so.

Next, by adding the rest of the fourth subcomponent material (remaining material of the fourth subcomponent for composing the dielectric ceramic composition) and the first to third and fifth subcomponent materials to the obtained post-reaction material followed by mixing and performing calcination if necessary, a dielectric ceramic composition powder is obtained. As the rest of the fourth subcomponent material, and the first to third and fifth subcomponent materials, the above oxides, mixture of them, composite oxides, and a variety of compounds to be the oxides and composite oxides when fired may be used.

Next, the thus obtained dielectric ceramic composition powder is used to produce dielectric layer paste. The dielectric layer paste may be organic based slurry obtained by kneading the dielectric ceramic composition powder and an organic vehicle, or water-based slurry.

An organic vehicle is obtained by dissolving a binder in an organic solvent. The binder used for the organic vehicle is not particularly limited and may be suitably selected from a variety of normal binders, such as ethyl cellulose and polyvinyl butyral. Also, the organic solvent to be used is not particularly limited and may be suitably selected from a variety of organic solvents, such as terpineol, butyl carbitol, acetone, and toluene, in accordance with a method to be used, such as the printing method and sheet method.

Also, when using water-based slurry as a dielectric layer paste, a water-based vehicle obtained by dissolving a water-soluble binder and dispersant, etc. in water may be kneaded with a dielectric material. The water-soluble binder used for the water based vehicle is not particularly limited and, for example, polyvinyl alcohol, cellulose and water-soluble acrylic resin, etc. may be used.

The internal electrode layer paste is fabricated by kneading a conductive material formed by the above variety of conductive metals and alloys or a variety of oxides, organic metal compounds, and resinates, etc., which become the above conductive materials after firing, with the above organic vehicle.

The external electrode paste may be fabricated in the same way as the above internal electrode layer paste.

A content of the organic vehicle in the above variety of paste is not particularly limited and may be a normal content. For example, the binder may be 1 to 5 wt % or so and the solvent may be 10 to 50 wt % or so. Also, additives selected from a variety of dispersants, plasticizers, dielectrics and insulators, etc. may be included in each paste if necessary. A total content thereof is preferably 10 wt % or smaller.

When using the printing method, the dielectric layer paste and the internal electrode layer paste are stacked by printing on a substrate, such as PET, cut into a predetermined shape and removed from the substrate to obtain a green chip.

When using the sheet method, the dielectric layer paste is used to form a green sheet, and the internal electrode layer paste is printed thereon. Then, the results are stacked to obtain green multilayer body and cut into a predetermined size so as to obtain a green chip.

Before firing, binder removal processing is performed on the green chip. As binder removal conditions, the temperature raising rate is preferably 5 to 300° C./hour and more preferably 10 to 100° C./hour, the holding temperature is preferably 180 to 400° C. and more preferably 200 to 300° C., and the temperature holding time is preferably 0.5 to 24 hours and more preferably 5 to 20 hours. The atmosphere at binder removal is preferably in the air.

Next, the green chip subjected to the binder removal processing is fired. An atmosphere at firing the green chip may be suitably determined in accordance with a kind of a conductive material in the internal electrode layer paste, but when using a base metal, such as Ni or a Ni alloy, as the conductive material, an oxygen partial pressure in the firing atmosphere is preferably $10^{-14}$ to $10^{-9}$ atm. When the oxygen partial pressure is lower than the above range, the conductive material in the internal electrode layer results in abnormal sintering to be broken in some cases. While, when the oxygen partial pressure exceeds the above range, the internal electrode layer tends to be oxidized.

Also, the holding temperature at firing is preferably 1000 to 1400° C., and more preferably 1100 to 1350° C. When the holding temperature is lower than the above range, densification becomes insufficient, while when exceeding the above range, breakings of electrodes due to abnormal sintering of the internal electrode layer, deterioration of capacity-temperature characteristics due to dispersion of the internal electrode layer component, and reduction of the dielectric ceramic composition are easily caused.

As other firing conditions, the temperature raising rate is preferably 100 to 900° C./hour and more preferably 200 to 900° C./hour, the temperature holding time is preferably 0.5 to 8 hours and more preferably 1 to 3 hours, and the cooling rate is preferably 50 to 500° C./hour and more preferably 200 to 300° C./hour. The firing atmosphere is preferably a reducing atmosphere, and a preferable atmosphere gas is for example a wet mixed gas of $N_2$ and $H_2$.

When firing in a reducing atmosphere, it is preferable that annealing is performed on the capacitor element body. Annealing is processing for re-oxidizing the dielectric layer and the IR lifetime is remarkably elongated thereby, so that the reliability is improved.

An oxygen partial pressure in the annealing atmosphere is preferably $10^{-8}$ atm or higher, and particularly preferably $10^{-7}$ to $10^{-4}$ atm. When the oxygen partial pressure is lower than the above range, re-oxidization of the dielectric layer becomes difficult, while when exceeding the above range, the internal electrode layer tends to be oxidized.

The holding temperature at annealing is preferably 1200° C. or lower, and particularly preferably 500 to 1200° C. When the holding temperature is lower than the above range, oxidization of the dielectric layer becomes insufficient, so that the IR becomes low and the IR accelerated lifetime becomes short easily. On the other hand, when the holding temperature exceeds the above range, not only the internal electrode layer is oxidized to reduce the capacity, but the internal electrode layer reacts with the dielectric base material, and deterioration of the capacity-temperature characteristics, a decline of the IR and a decline of the IR accelerated lifetime are easily caused.

As other annealing conditions, the temperature raising rate is preferably 100 to 900° C./hour and more preferably 200 to 900° C./hour, the temperature holding time is preferably 0.5 to 12 hours and more preferably 1 to 10 hours, and the cooling rate is preferably 50 to 600° C./hour and more preferably 100 to 300° C./hour. Also, a preferable atmosphere gas at annealing is for example a wet $N_2$ gas, etc.

In the above binder removal processing, firing and annealing, for example, a wetter, etc. may be used to wet the $N_2$ gas and mixed gas, etc. In that case, the water temperature is preferably 5 to 75° C. or so. Note that the binder removal processing, firing and annealing may be performed continuously or separately.

End surface polishing, for example, by barrel polishing or sand blast, etc. is performed on the capacitor element body obtained as above, and the external electrode paste is printed or transferred and fired to form external electrodes 4. A firing condition of the external electrode paste is preferably, for example, at 600 to 800° C. in a wet mixed gas of $N_2$ and $H_2$ for 10 minutes to 1 hour or so. A cover layer is formed by plating, etc. on the surface of the external electrodes 4 if necessary.

The specific explanation on the production method according to the second aspect is same as that on the production method according to the first aspect except for the following steps.

In the production method of a dielectric ceramic composition according to the second aspect, a dielectric ceramic composition powder included in the dielectric layer paste is fabricated at first.

In the second aspect, the dielectric ceramic composition powder is fabricated as below. First, a material of the main component and a part of a material of the fourth (a) subcomponent and/or a part of a material of the fourth (b) subcomponent (a material corresponding to a part of the fourth (a) and fourth (b) subcomponents to be included in the dielectric ceramic composition) are reacted or preferably dispersed as solid solution in advance, so that a post-reaction material is obtained (a pre-adding step of the subcomponent). Next, the post-reaction material is added with the rest of the fourth (a) subcomponent material and the fourth (b) subcomponent material (remaining materials in the fourth (a) and fourth (b) subcomponents for composing the dielectric ceramic composition) and the above first to third and fifth subcomponent materials (a post-adding step of the subcomponent). Then, calcination is performed if necessary, and a dielectric ceramic composition powder is fabricated.

The main component material used in the above step is the same as in the first aspect. As the subcomponent materials used in the above step to be reacted in advance with the main component material, the oxides of R1 or R2 and a variety of compounds to be the oxides of R1 or R2 when fired may be used. For example, a part of the oxides of R1 alone may be reacted in advance, a part of the oxides of R1 alone may be reacted in advance, or a part of the oxides of R1 and a part of the oxides of R2 may be reacted in advance. As the oxides of R1 or R2 and the compounds to be the oxides of R1 or R2 when fired, powder materials having an average particle diameter of 0.01 to 0.1 μm or so or sol materials mentioned above in the first aspect, etc. may be used.

The fourth (a) subcomponent material and/or the fourth (b) subcomponent material reacted in advance with the main component material is preferably more than 0 to 0.5 mole, and more preferably more than 0 to 0.4 mole, and furthermore preferably more than 0 to 0.25 mole in terms of R1 and/or R2 with respect to 100 moles of the main component.

When amounts of the fourth (a) subcomponent material and/or the fourth (b) subcomponent material reacted in advance with the main component are too large, a crystal grain diameter of a sintered body obtained after firing becomes too large, and it is liable that a temperature characteristic of capacitance declines and that the IR declines.

As a method of obtaining the post-reaction material by reacting the main component material in advance with a part of the fourth (a) subcomponent material and/or a part of the fourth (b) subcomponent material, a method of mixing the main component material and the subcomponent materials by using a solvent, etc., evaporating the solvent and performing calcination, and a method of adding a precipitant to a mixed solution, depositing the subcomponents on the main component and performing calcination, etc. may be mentioned as with the first aspect. Note that a temperature at the calcination is preferably 500 to 700° C. or so.

Next, by adding the rest of the fourth (a) subcomponent material and the fourth (b) subcomponent material (remaining materials of the fourth (a) and the fourth (b) subcomponents for composing the dielectric ceramic composition) and the first to third and fifth subcomponent materials to the obtained post-reaction material, followed by mixing and performing calcination if necessary, a dielectric ceramic composition powder is obtained. As the rest of the fourth (a) and fourth (b) subcomponent materials, and the first to third and fifth subcomponent materials, the above oxides and mixture of them, composite oxides, and a variety of compounds to be the oxides and composite oxides when fired may be used.

The rest of the steps can be referred to the explanation on the production method of a dielectric ceramic composition according to the first aspect.

A multilayer ceramic capacitor of the present invention produced as above is mounted on a print substrate, etc. by soldering, etc. and used for a variety of electronic apparatuses, etc.

An embodiment of the present invention was explained above, but the present invention is not limited to the above embodiment and may be variously modified within the scope of the present invention.

For example, in the above embodiment, a multilayer ceramic capacitor was explained as an example of an electronic device according to the present invention, but an electronic device according to the present invention is not limited to the multilayer ceramic capacitor and may be any as far as it includes a dielectric layer composed of a dielectric ceramic composition having the above composition.

EXAMPLES

Below, the present invention will be explained based on furthermore detailed examples, but the present invention is not limited to the examples.

Example 1

First, $BaTiO_3$ and $CaTiO_3$ powders having an average particle diameter of 0.30 μm as the main component material and $Y_2O_3$ powder as the fourth subcomponent material to be reacted in advance (pre-added material) were prepared. Next, the prepared main component powders and a part of $Y_2O_3$ powder were weighed to obtain respective amounts shown in Table 1, wet mixed/pulverized by a ball mill to obtain slurry. After drying the slurry, calcination and pulverizing were performed, so that a post-reaction material was obtained. Note that the calcination condition was the temperature raising rate of 200° C./hour, the holding temperature of 500° C., the temperature holding time of two hours and an atmosphere in the air. Namely, in the sample 1, only $BaTiO_3$ powder was used as the main component material. An amount of $Y_2O_3$ to be reacted in advance was 0.1 mole in terms of Y atom (0.05 mole in terms of $Y_2O_3$) with respect to 100 moles of the main component (note that an amount of $Y_2O_3$ will be in terms of Y atom in any samples below in the present specification).

Next, as the fourth subcomponent material (post-added material) to be added to the obtained post-reaction material, $Y_2O_3$ was used. An added amount of $Y_2O_3$ in terms of Y atom was that in Table 1 with respect to 100 moles of the main component. Namely, in the sample 1, it was 0.5 mole in terms of Y atom (an added amount in terms of $Y_2O_3$ was 0.25 mole). Materials of the first to third and fifth subcomponent and amounts of the respective subcomponents to be added to the obtained post-reaction material were as below. Namely, MgO (the first subcomponent) was added in an amount of 1.0 mole, $(Ba, Ca)SiO_3$ (the second subcomponent) 0.875 mole, $V_2O_5$ (the third subcomponent) 0.044 mole and MnO (the fifth subcomponent) 0.1 mole. The post-reaction material added with the above subcomponent materials was wet mixed and pulverized by a ball mill to form slurry, and the slurry was preliminarily fired and pulverized after drying, so that a dielectric ceramic composition powder was obtained. Note that added amounts of the respective subcomponents were those calculated as a conversion of respective oxides (note that $Y_2O_3$ was calculated as a conversion of Y atom) with respect to 100 moles of the main component.

Note that the total amount of $Y_2O_3$ reacted in advance (pre-added material) and $Y_2O_3$ added to the obtained post-reaction material (post-added material) is $Y_2O_3$ amount included in the finally obtained dielectric ceramic composition in the sample 1.

The thus obtained dielectric ceramic composition powder in an amount of 100 parts by weight, an acrylic resin in an amount of 4.8 parts by weight, ethyl acetate in an amount of 100 parts by weight, mineral spirit in an amount of 6 parts by weight and toluene in an amount of 4 parts by weight were mixed by a ball mill to form paste, so that dielectric layer paste was obtained.

Next, Ni particles in an amount of 44.6 parts by weight, terpineol in an amount of 52 parts by weight, ethyl cellulose in an amount of 3 parts by weight, benzotriazole in an amount of 0.4 part by weight were kneaded by a triple-roll to form slurry, so that internal electrode layer paste was obtained.

These pastes were used to produce the multilayer ceramic chip capacitor 1 shown in FIG. 1 as below.

First, the obtained dielectric layer paste was used to form a green sheet on a PET film. After printing the internal electrode paste thereon, the sheet was removed from the PET film. Next, the green sheets and protective green sheets (without the internal electrode layer paste printed thereon) were stacked and bonded by pressure, so that a green multilayer body was obtained. Then, the green multilayer body was cut into a predetermined size to obtain a green chip followed by binder removal processing, firing and annealing under the conditions below, so that a multilayer ceramic fired body was obtained.

The binder removal processing condition was a temperature raising rate of 32.5° C./hour, holding temperature of 260° C., the temperature holding time of 8 hours and atmosphere in the air.

The firing condition was a temperature raising rate of 200° C./hour, holding temperature of 1260 to 1280° C., the temperature holding time of 2 hours, cooling rate of 200° C./hour, and an atmosphere of a wet mixed gas of $N_2+H_2$ (oxygen partial pressure was $10^{+12}$ atm).

The annealing condition was a temperature raising rate of 200° C./hour, holding temperature of 1050° C., the temperature holding time of 2 hours, cooling rate of 200° C./hour, and an atmosphere of a wet $N_2$ gas (oxygen partial pressure was $10^{-5}$ atm).

Note that a wetter with a water temperature of 20° C. was used to wet the atmosphere gases at firing and annealing.

Next, end surfaces of the obtained multilayer ceramic fired body were polished by sand blast and, then, an In—Ga alloy was applied as external electrodes, so that samples of multilayer ceramic capacitor as an example 1 shown in FIG. 1 were obtained.

A size of the obtained capacitor samples was 3.2 mm×1.6 mm×0.6 mm, the number of dielectric layers sandwiched by the internal electrode layers was 4, a thickness (interlayer thickness) of one dielectric layer was 3.5 μm, and a thickness of one internal electrode layer was 1.2 μm. Next, on the obtained capacitor samples, an average crystal grain diameter of dielectric particles, specific permittivity $\epsilon$, a dielectric loss tan δ, insulation resistance IR, a CR product, a temperature characteristic of capacitance and an IR accelerated lifetime were evaluated by the methods explained below. Also, from the result of conducting an XPS measurement on the post-reaction material obtained by reacting $BaTiO_3$ with $Y_2O_3$, it was confirmed that respective elements of Ba, Ti and Y were uniformly distributed inside particles.

Specific Permittivity $\epsilon$

On each of the capacitor samples, capacitance C was measured under a condition of a reference temperature of 20° C., using a digital LCR meter (YHP4274A made by Yokogawa Electric Corporation), a frequency of 120 Hz and an input signal level (measurement voltage) of 0.5 Vrms/μm. Then, specific permittivity (no unit) was calculated from the obtained capacitance, a dielectric thickness and a superimposing area of internal electrodes in the multilayer ceramic capacitor. The higher the specific permittivity is, the more preferable. The results are shown in Table 1.

Dielectric Loss tan δ

On each of the capacitor samples, a dielectric loss tan δ was measured under a condition of a reference temperature of 20° C., using a digital LCR meter (YHP4274A made by Yokogawa Electric Corporation), a frequency of 120 Hz and an input signal level (measurement voltage) of 0.5 Vrms/μm. The smaller the dielectric loss is, the more preferable. The results are shown in Table 1.

Insulation Resistance IR

On each of the capacitor samples, insulation resistance IR was measured by using an insulation resistance tester (R8340A made by Advantest Corporation) after applying a direct current voltage of 4 V/μm for one minute at 20° C. The larger the insulation resistance IR is, the more preferable. The results are shown in Table 1.

CR Product

A CR product was measured by obtaining a product of the capacitance C (unit: μF) and insulation resistance IR (unit: MΩ) measured as explained above. The larger the CR product is, the more preferable. The results are shown in Table 1.

Temperature Characteristic of Capacitance

On each of the capacitor samples, capacitance at −25 to 85° C. was measured and a change rate ΔC of the capacitance was calculated to evaluate whether the B characteristics of the JIS standard were satisfied or not. Namely, evaluation was made on whether the change rate ΔC was within ±10% or not at −25 to 85° C. The results are shown in Table 1. Note that samples satisfying the B characteristics were marked as "very good", those having the change rate ΔC within ±15% were marked as "good" and those having the change rate ΔC exceeding ±15% were marked as "poor" in Table 1.

TABLE 1

| Sample No. | Main Component $(Ba_{1-x}, Ca_x)(Ti_{1-y}, Zr_y)O_3$ x | y | 4th Subcomponent Pre-adding Y [mol] | Post-adding Y [mol] | Specific Permittivity $\epsilon$ | tan δ [%] | IR [Ω·m] | CR Product [μF·MΩ] | Temperature Characteristic (B) |
|---|---|---|---|---|---|---|---|---|---|
| Sample 1 | 0 | 0 | 0.1 | 0.5 | 4800 | 8.1 | 1.2E+11 | 5100 | very good |
| Sample 2 | 0 | 0 | 0 | 0.6 | 3100 | 4.2 | 1.1E+11 | 3020 | poor |

TABLE 1-continued

|  | Main Component $(Ba_{1-x}Ca_x)(Ti_{1-y}Zr_y)O_3$ | | 4th Subcomponent | | Specific Permittivity | tan δ | IR | CR Product | Temperature Characteristic |
|---|---|---|---|---|---|---|---|---|---|
|  |  |  | Pre-adding Y | Post-adding Y |  |  |  |  |  |
| Sample No. | x | y | [mol] | [mol] | ε | [%] | [Ω·m] | [μF·MΩ] | (B) |
| Sample 3 | 0.02 | 0 | 0.1 | 0.5 | 3850 | 6.2 | 1.4E+11 | 4770 | very good |
| Sample 4 | 0.02 | 0 | 0 | 0.6 | 2790 | 3.5 | 1.2E+11 | 2960 | very good |

With respect to 100 moles of the main component
first subcomponent: MgO 1.0 mol
second subcomponent: (Ba, Ca)SiO$_3$ 0.875 mol
third subcomponent: V$_2$O$_5$ 0.044 mol
fifth subcomponent: MnO 0.1 mol
Average particle diameter of the main component material: 0.30 μm
Thickness (interlayer thickness) of one dielectric layer = 3.5 μm
In the table, "mE + n" means "m × 10$^{+n}$"

Evaluation 1

From Table 1, it was confirmed that all of the capacitor samples in the samples 1 and 3, wherein the main component material and the fourth subcomponent (Y$_2$O$_3$) material were reacted in advance, exhibited high specific permittivity, a preferable temperature characteristic of capacitance and preferable other electric characteristics (a dielectric loss tan δ, insulation resistance IR and a CR product). It was also confirmed that the above properties were preferable in either case of using only BaTiO$_3$ powder (sample 1) or using BaTiO$_3$ and CaTiO$_3$ powders (sample 3) as the main component material.

On the other hand, in the samples 2 and 4, wherein the main component and Y$_2$O$_3$ were not reacted in advance, the specific permittivity was considerably reduced, and it was confirmed to be difficult to attain downsizing and a larger capacity. From the above results, it was confirmed that reacting the main component material and a part of the fourth subcomponent (Y$_2$O$_3$) material in advance resulted in high specific permittivity and preferable temperature characteristic of capacitance as well as preferable other electric characteristics (a dielectric loss tan δ, insulation resistance IR and a CR product).

Example 2

As with sample 1, only BaTiO$_3$ powder was used as the main component material, and Y$_2$O$_3$ (the fourth (a) subcomponent) was used as a material to be reacted in advance. Also, except for changing an amount of Y$_2$O$_3$ (the fourth (a) subcomponent) reacted in advance with the main component material to a value shown in Table 2 in terms of Y atom and amounts of Y$_2$O$_3$ (the fourth (a) subcomponent) and Gd$_2$O$_3$ (the fourth (b) subcomponent) added to the post-reaction material to values shown in Table 2 in terms of Y atom and Gd atom, each capacitor sample was obtained as with sample 1. The obtained respective samples were evaluated in the same way as in the example 1. The results are shown in Table 2.

Note that the ratio M2/M1 between number of moles M1 of R1 of the fourth (a) subcomponent (pre-adding 0.05 mole and post-added 0.55 mole=0.6 mole) and number of moles M2 of R2 of the fourth (b) subcomponent (0.05 mole) in the finally-obtained dielectric ceramic composition was 0.08 in the example 2.

TABLE 2

|  | Main Component $(Ba_{1-x}Ca_x)(Ti_{1-y}Zr_y)O_3$ | | Subcomponent | | | | Specific Permittivity | tan δ | IR | CR Product | Temperature Characteristic |
|---|---|---|---|---|---|---|---|---|---|---|---|
|  |  |  | Pre-adding | Post-adding | | | | | | | |
|  |  |  | 4th(a) (R1) Y | 4th(a) (R1) Y | 4th(b) (R2) Gd | Mole Ratio of R1 & R2 | | | | | |
| Sample No. | x | y | [mol] | [mol] | [mol] | M2/M1 | ε | [%] | [Ω·m] | [μF·MΩ] | (B) |
| Sample 2 | 0 | 0 | 0 | 0.6 | 0 | 0 | 3100 | 4.2 | 1.1E+11 | 3020 | poor |
| Sample 11 | 0 | 0 | 0.05 | 0.55 | 0.05 | 0.08 | 4780 | 6.8 | 1.2E+11 | 5170 | very good |
| Sample 12 | 0 | 0 | 0.1 | 0.5 | 0.05 | 0.08 | 5200 | 8.2 | 1.1E+11 | 5060 | very good |
| Sample 13 | 0 | 0 | 0.2 | 0.4 | 0.05 | 0.08 | 4950 | 8.9 | 1.1E+11 | 4820 | very good |
| Sample 14 | 0 | 0 | 0.5 | 0.1 | 0.05 | 0.08 | 4620 | 9.7 | 1.0E+11 | 4090 | very good |
| Sample 15 | 0 | 0 | 0.6 | 0 | 0.05 | 0.08 | 5400 | 15.6 | 9.0E+11 | 4300 | poor |

With respect to 100 moles of the main component
first subcomponent: MgO 1.0 mol
second subcomponent: (Ba, Ca)SiO$_3$ 0.875 mol
third subcomponent: V$_2$O$_5$ 0.044 mol
fifth subcomponent: MnO 0.1 mol
Average particle diameter of the main component material: 0.30 μm
Thickness (interlayer thickness) of one dielectric layer = 3.5 μm
In the table, "mE + n" means "m × 10$^{+n}$"

Evaluation 2

From Table 2, when using $Y_2O_3$ (the fourth (a) subcomponent) as the material reacted in advance with the main component material, and choosing $Y_2O_3$ (the fourth (a) subcomponent) and $Gd_2O_3$ (the fourth (b) subcomponent) as the material added to the post-reaction material, it was also confirmed that specific permittivity was high, and that temperature characteristic of capacitance was preferable. However, in the sample wherein the $Y_2O_3$ amount to be reacted in advance was 0.6 mole (sample 15), it was confirmed that a dielectric loss tan δ, IR and temperature characteristic of capacitance were deteriorated while specific permittivity was high. Therefore, it was confirmed that the amounts of the fourth (a) subcomponent and/or the fourth (b) subcomponent to be reacted in advance with the main component material are preferably 0.5 mole or smaller that is the preferable range of the present invention.

Example 3

As with sample 1, only $BaTiO_3$ powder was used as the main component material, and $Yb_2O_3$ (the fourth (a) subcomponent) was used instead of $Y_2O_3$ (the fourth (a) subcomponent) as a material to be reacted in advance. Also, except for changing an amount of $Yb_2O_3$ (the fourth (a) subcomponent) reacted in advance with the main component material and amounts of $Y_2O_3$ (the fourth (a) subcomponent) and $Gd_2O_3$ (the fourth (b) subcomponent) added to the post-reaction material to values shown in Table 3 in terms of R1 and R2 respectively, each capacitor sample was obtained as with the example 1. The obtained respective samples were evaluated in the same way as in the example 1. The results are shown in Table 3.

Note that the ratio M2/M1 between number of moles M1 of R1 of the fourth (a) subcomponent and number of moles M2 of R2 of the fourth (b) subcomponent in the finally-obtained dielectric ceramic composition was 0.08 in the example 3.

Evaluation 3

From Table 3, when using $Yb_2O_3$ (the fourth (a) subcomponent) was used instead of $Y_2O_3$ (the fourth (a) subcomponent) as the material to be reacted in advance with the main component material, it was confirmed to show the same tendency as in the example 2.

Example 4

As with sample 1, only $BaTiO_3$ powder was used as the main component material, and $Y_2O_3$ (the fourth (a) subcomponent) was used as a material to be reacted in advance. Also, except for changing an amount of $Y_2O_3$ (the fourth (a) subcomponent) reacted in advance with the main component material and amounts of $Y_2O_3$ (the fourth (a) subcomponent) and $Gd_2O_3$ (the fourth (b) subcomponent) added to the post-reaction material to values shown in Table 4 in terms of R1 and R2 respectively, each capacitor sample was obtained as with the example 1. The obtained respective samples were evaluated in the same way as in the example 1. The results are shown in Table 4.

Note that the ratio M2/M1 between number of moles M1 of R1 of the fourth (a) subcomponent and number of moles M2 of R2 of the fourth (b) subcomponent in the finally-obtained dielectric ceramic composition was in the range of 0.03 to 0.25 in Table 4.

TABLE 3

| | Main Component $(Ba_{1-x}, Ca_x)(Ti_{1-y}, Zr_y)O_3$ | | Subcomponent | | | | Specific | | | | Temperature |
|---|---|---|---|---|---|---|---|---|---|---|---|
| | | | Pre-adding | Post-adding | | | | | | | |
| | | | 4th(a) (R1) | 4th(a) (R1) | 4th(b) (R2) | Mole Ratio | Permit- | | | CR | Charac- |
| Sample | | | Yb | Y | Gd | of R1 & R2 | tivity | tan δ | IR | Product | teristic |
| No. | x | y | [mol] | [mol] | [mol] | M2/M1 | ε | [%] | [Ω · m] | [μF · MΩ] | (B) |
| Sample 2 | 0 | 0 | 0 | 0.6 | 0 | 0 | 3100 | 4.2 | 1.1E+11 | 3020 | poor |
| Sample 21 | 0 | 0 | 0.05 | 0.55 | 0.05 | 0.08 | 4650 | 6.6 | 1.2E+11 | 4940 | very good |
| Sample 22 | 0 | 0 | 0.1 | 0.5 | 0.05 | 0.08 | 5050 | 8.0 | 1.1E+11 | 4920 | very good |
| Sample 23 | 0 | 0 | 0.2 | 0.4 | 0.05 | 0.08 | 4860 | 8.8 | 1.2E+11 | 5160 | very good |
| Sample 24 | 0 | 0 | 0.5 | 0.1 | 0.05 | 0.08 | 4600 | 9.8 | 1.0E+11 | 4070 | very good |
| Sample 25 | 0 | 0 | 0.6 | 0 | 0.05 | 0.08 | 6020 | 14.7 | 8.6E+10 | 4580 | poor |

With respect to 100 moles of the main component first subcomponent: MgO 1.0 mol second subcomponent: (Ba, Ca)SiO$_3$ 0.875 mol third subcomponent: $V_2O_5$ 0.044 mol fifth subcomponent: MnO 0.1 mol Average particle diameter of the main component material: 0.30 μm Thickness (interlayer thickness) of one dielectric layer = 3.5 μm In the table, "mE + n" means "m × $10^{+n}$"

TABLE 4

| Sample No. | Main Component $(Ba_{1-x}, Ca_x)(Ti_{1-y}, Zr_y)O_3$ x | Main Component $(Ba_{1-x}, Ca_x)(Ti_{1-y}, Zr_y)O_3$ y | Subcomponent Pre-adding 4th(a) (R1) Y [mol] | Subcomponent Post-adding 4th(a) (R1) Y [mol] | Subcomponent Post-adding 4th(b) (R2) Gd [mol] | Mole Ratio of R1 & R2 M2/M1 | Specific Permittivity ε | tan δ [%] | IR [Ω·m] | CR Product [μF·MΩ] | Temperature Characteristic (B) |
|---|---|---|---|---|---|---|---|---|---|---|---|
| Sample 1  | 0 | 0 | 0.1 | 0.5 | 0     | 0    | 4800 | 8.1 | 1.2E+11 | 5100 | very good |
| Sample 31 | 0 | 0 | 0.1 | 0.5 | 0.02  | 0.03 | 4900 | 8.1 | 1.2E+11 | 5200 | very good |
| Sample 12 | 0 | 0 | 0.1 | 0.5 | 0.05  | 0.08 | 5200 | 8.2 | 1.1E+11 | 5060 | very good |
| Sample 32 | 0 | 0 | 0.1 | 0.5 | 0.075 | 0.13 | 5400 | 8.4 | 1.3E+11 | 6220 | very good |
| Sample 33 | 0 | 0 | 0.1 | 0.5 | 0.1   | 0.17 | 4900 | 8.3 | 1.2E+11 | 5200 | very good |
| Sample 34 | 0 | 0 | 0.1 | 0.5 | 0.125 | 0.21 | 4500 | 8.1 | 1.0E+11 | 3980 | very good |
| Sample 35 | 0 | 0 | 0.1 | 0.5 | 0.15  | 0.25 | 4000 | 8.1 | 1.1E+11 | 3900 | good |

With respect to 100 moles of the main component
first subcomponent: MgO 1.0 mol
second subcomponent: (Ba, Ca)SiO$_3$ 0.875 mol
third subcomponent: V$_2$O$_5$ 0.044 mol
fifth subcomponent: MnO 0.1 mol
Average particle diameter of the main component material: 0.30 μm
Thickness (interlayer thickness) of one dielectric layer = 3.5 μm
In the table, "mE + n" means "m × 10$^{+n}$"

Evaluation 4

From Table 4, it was confirmed that the change in the amounts of the fourth (b) subcomponent material added to the post-reaction material resulted in preferable specific permittivity as well as preferable other characteristics such as temperature characteristic of capacitance and IR. Also, when the mole ratio of R1 and R2, M2/M1, was within the range of the present invention, it was confirmed that characteristics such as specific permittivity and temperature characteristic of capacitance were preferable. Note that the sample 35 did not satisfy the B characteristics, but the deviation was very small.

Example 5

As with sample 1, only BaTiO$_3$ powder was used as the main component material, and Tb$_2$O$_3$ (the fourth (b) subcomponent) was used as a material to be reacted in advance. Also, except for changing an amount of Tb$_2$O$_3$ (the fourth (b) subcomponent) reacted in advance with the main component material and amounts of Y$_2$O$_3$ (the fourth (a) subcomponent) and Gd$_2$O$_3$ (the fourth (b) subcomponent) added to the post-reaction material to values shown in Table 5 in terms of R1 and R2 respectively, each capacitor sample was obtained as with the example 1. The obtained respective samples were evaluated in the same way as in the example 1. The results are shown in Table 5.

Note that the ratio M2/M1 between number of moles M1 of R1 of the fourth (a) subcomponent and number of moles M2 of R2 of the fourth (b) subcomponent in the finally-obtained dielectric ceramic composition was in the range of 0.08 to 0.42 in Table 5.

TABLE 5

| Sample No. | Main Component $(Ba_{1-x}, Ca_x)(Ti_{1-y}, Zr_y)O_3$ x | Main Component $(Ba_{1-x}, Ca_x)(Ti_{1-y}, Zr_y)O_3$ y | Subcomponent Pre-adding 4th(b) (R2) Tb [mol] | Subcomponent Post-adding 4th(a) (R1) Y [mol] | Subcomponent Post-adding 4th(b) (R2) Gd [mol] | Mole Ratio of R1 & R2 M2/M1 | Specific Permittivity ε | tan δ [%] | IR [Ω·m] | CR Product [μF·MΩ] | Temperature Characteristic (B) |
|---|---|---|---|---|---|---|---|---|---|---|---|
| Sample 41 | 0 | 0 | 0    | 0.6 | 0.05 | 0.08 | 2940 | 4.0 | 1.2E+11 | 3120 | poor |
| Sample 42 | 0 | 0 | 0.05 | 0.6 | 0.05 | 0.17 | 4580 | 7.3 | 1.3E+11 | 5070 | very good |
| Sample 43 | 0 | 0 | 0.1  | 0.6 | 0.05 | 0.25 | 4700 | 8.2 | 1.2E+11 | 4990 | very good |
| Sample 44 | 0 | 0 | 0.2  | 0.6 | 0.05 | 0.42 | 4850 | 9.2 | 1.1E+11 | 4770 | poor |

With respect to 100 moles of the main component
first subcomponent: MgO 1.0 mol
second subcomponent: (Ba, Ca)SiO$_3$ 0.875 mol
third subcomponent: V$_2$O$_5$ 0.044 mol
fifth subcomponent: MnO 0.1 mol
Average particle diameter of the main component material: 0.30 μm
Thickness (interlayer thickness) of one dielectric layer = 3.5 μm
In the table, "mE + n" means "m × 10$^{+n}$"

Evaluation 5

From Table 5, when using the fourth (b) subcomponent instead of the fourth (a) subcomponent as the material to be reacted in advance with the main component material, it was confirmed to have preferable results as well as the examples 2 and 3. Also, when the mole ratio of R1 and R2, M2/M1, was outside the range of the present invention (sample 44), it was confirmed that temperature characteristic of capacitance was liable to be deteriorated.

Example 6

As with sample 3, $BaTiO_3$ and $CaTiO_3$ powders were used as the main component material with the ratio of Ba and Ca as shown in Table 6. Also, $Y_2O_3$ (the fourth (a) subcomponent) was used as a material to be reacted in advance, and $Y_2O_3$ (the fourth (a) subcomponent) and $Gd_2O_3$ (the fourth (b) subcomponent) were used as materials added to the post-reaction material. Except for changing these amounts to values shown in Table 6 in terms of R1 and R2 respectively, each capacitor sample was obtained as with the example 1. The obtained respective samples were evaluated in the same way as in the example 1.

Note that the ratio M2/M1 between number of moles M1 of R1 of the fourth (a) subcomponent and number of moles M2 of R2 of the fourth (b) subcomponent in the finally-obtained dielectric ceramic composition was 0.08 in the example 6. The results are shown in Table 6.

Evaluation 6

From Table 6, when using $BaTiO_3$ and $CaTiO_3$ powders as the main component material, it was confirmed to have preferable results as well as the examples 2 and 3.

Example 7

Further, $BaZrO_3$ powder with an average particle size of 0.30 μm was prepared, and $BaTiO_3$, $CaTiO_3$, and $BaZrO_3$ powders were used as the main component material. Also, $Y_2O_3$ (the fourth subcomponent) was used as a material to be reacted in advance, and $Y_2O_3$ (the fourth subcomponent) were used as materials added to the post-reaction material. Except for changing these amounts to values shown in Table 7 in terms of Y atom, each capacitor sample was obtained as with the example 1. The obtained respective samples were evaluated on each characteristic except for a temperature characteristic of capacitance in the same way as in the example 1. The results are shown in Table 7.

The temperature characteristic of capacitance in the example 7 was performed as below.

Namely, the capacitance at −55 to 105° C. was measured for the capacitor samples, and a change rate ΔC of the capacitance was calculated to evaluate whether the X6S characteristics of the EIA standard were satisfied or not. Namely, evaluation was made on whether the change rate ΔC was within ±22% or not at −55 to 105° C. The results are shown in Table 7. Note that samples satisfying the X6S characteristics were marked as "very good", those having the change rate ΔC within ±25% were marked as "good" and those having the change rate ΔC exceeding ±95% were marked as "poor" in Table 7.

TABLE 6

| Sample No. | Main Component $(Ba_{1-x}, Ca_x)(Ti_{1-y}, Zr_y)O_3$ x | y | Pre-adding 4th(a) (R1) Y [mol] | Post-adding 4th(a) (R1) Y [mol] | Post-adding 4th(b) (R2) Gd [mol] | Mole Ratio of R1 & R2 M2/M1 | Specific Permittivity ε | tan δ [%] | IR [Ω·m] | CR Product [μF·MΩ] | Temperature Characteristic (B) |
|---|---|---|---|---|---|---|---|---|---|---|---|
| Sample 4 | 0.02 | 0 | 0 | 0.6 | 0 | 0 | 2790 | 3.5 | 1.2E+11 | 2960 | very good |
| Sample 51 | 0.02 | 0 | 0.05 | 0.55 | 0.05 | 0.08 | 3900 | 6.1 | 1.3E+11 | 4490 | very good |
| Sample 52 | 0.02 | 0 | 0.1 | 0.5 | 0.05 | 0.08 | 3960 | 6.8 | 1.3E+11 | 4560 | very good |
| Sample 53 | 0.02 | 0 | 0.2 | 0.4 | 0.05 | 0.08 | 3720 | 6.1 | 1.1E+11 | 3620 | very good |
| Sample 54 | 0.02 | 0 | 0.5 | 0.1 | 0.05 | 0.08 | 3450 | 5.9 | 1.0E+11 | 3050 | very good |
| Sample 55 | 0.02 | 0 | 0.6 | 0 | 0.05 | 0.08 | 4960 | 12.4 | 8.0E+10 | 3510 | poor |

With respect to 100 moles of the main component first subcomponent: MgO 1.0 mol second subcomponent: (Ba, Ca)SiO_3 0.875 mol third subcomponent: $V_2O_5$ 0.044 mol fifth subcomponent: MnO 0.1 mol Average particle diameter of the main component material: 0.30 μm Thickness (interlayer thickness) of one dielectric layer = 3.5 μm In the table, "mE + n" means "m × 10$^{+n}$"

TABLE 7

| Sample No. | Main Component $(Ba_{1-x}Ca_x)(Ti_{1-y}Zr_y)O_3$ x | y | 4th Subcomponent Pre-adding Y [mol] | 4th Subcomponent Post-adding Y [mol] | Specific Permittivity ϵ | tan δ [%] | IR [Ω·m] | CR Product [μF·MΩ] | Temperature Characteristic (X6S) |
|---|---|---|---|---|---|---|---|---|---|
| Sample 61 | 0.04 | 0.1 | 0.1 | 0.5 | 9240 | 6.5 | 1.5E+11 | 12270 | very good |
| Sample 62 | 0.04 | 0.1 | 0 | 0.6 | 5960 | 6.3 | 1.4E+11 | 7390 | very good |
| Sample 63 | 0 | 0.08 | 0.1 | 0.5 | 6560 | 7.0 | 1.3E+11 | 7550 | very good |
| Sample 64 | 0 | 0.08 | 0 | 0.6 | 5600 | 5.8 | 1.4E+11 | 6940 | very good |

With respect to 100 moles of the main component
first subcomponent: MgO 1.0 mol
second subcomponent: (Ba, Ca)SiO₃ 0.875 mol
third subcomponent: V₂O₅ 0.044 mol
fifth subcomponent: MnO 0.1 mol
Average particle diameter of the main component material: 0.30 μm
Thickness (interlayer thickness) of one dielectric layer = 3.5 μm
In the table, "mE + n" means "m × 10$^{+n}$"

Evaluation 7

From Table 7, it was confirmed that all of the capacitor samples in the samples 61 and 63, wherein the main component material and the fourth subcomponent ($Y_2O_3$) material were reacted in advance, exhibited high specific permittivity, a preferable temperature characteristic of capacitance and preferable other electric characteristics (a dielectric loss tan δ, insulation resistance IR and a CR product). It was also confirmed that the above characteristics were preferable in either case of using $BaTiO_3$, $CaTiO_3$ and $BaZrO_3$ powders (sample 61) or using $BaTiO_3$ and $BaZrO_3$ powders (sample 63) as the main component material.

On the other hand, in the samples 62 and 64, wherein the main component and $Y_2O_3$ were not reacted in advance, it was confirmed that the specific permittivity was considerably reduced compared with the samples 61 and 63.

Since the above results showed the same tendency of the example 1, it was confirmed that reacting the main component material and a part of the fourth subcomponent ($Y_2O_3$) material in advance resulted in high specific permittivity and preferable temperature characteristic of capacitance as well as preferable other electric characteristics (a dielectric loss tan δ, insulation resistance IR and a CR product) even when using different main component materials.

Therefore, it is possible to produce a dielectric ceramic composition depending on desired characteristics, offering greater flexibility to compositional design.

Example 8

As with sample 63, $BaTiO_3$ and $BaZrO_3$ powders were used as the main component material. Except for using $Yb_2O_3$ (the fourth (a) subcomponent) as a material to be reacted in advance, and changing an amount of $Yb_2O_3$ (the fourth (a) subcomponent) to be reacted in advance and amounts of $Y_2O_3$ (the fourth (a) subcomponent) and $Gd_2O_3$ (the fourth (b) subcomponent) as materials added to the post-reaction material to values shown in Table 8 in terms of R1 and R2 respectively, each capacitor sample was obtained as with the example 1. The obtained respective samples were evaluated in the same way as in the example 7. The results are shown in Table 8.

Note that the ratio M2/M1 between number of moles M1 of R1 of the fourth (a) subcomponent and number of moles M2 of R2 of the fourth (b) subcomponent in the finally-obtained dielectric ceramic composition was 0.08 in Table 8.

TABLE 8

| Sample No. | Main Component $(Ba_{1-x}Ca_x)(Ti_{1-y}Zr_y)O_3$ x | y | Pre-adding 4th(a) (R1) Yb [mol] | Post-adding 4th(a) (R1) Y [mol] | Post-adding 4th(b) (R2) Gd [mol] | Mole Ratio of R1 & R2 M2/M1 | Specific Permittivity ϵ | tan δ [%] | IR [Ω·m] | CR Product [μF·MΩ] | Temperature Characteristic (X6S) |
|---|---|---|---|---|---|---|---|---|---|---|---|
| Sample 64 | 0 | 0.08 | 0 | 0.6 | 0 | 0 | 5600 | 5.8 | 1.4E+11 | 6940 | very good |
| Sample 71 | 0 | 0.08 | 0.05 | 0.55 | 0.05 | 0.08 | 7050 | 6.9 | 1.3E+11 | 8110 | very good |
| Sample 72 | 0 | 0.08 | 0.1 | 0.5 | 0.05 | 0.08 | 6820 | 7.1 | 1.2E+11 | 7250 | very good |
| Sample 73 | 0 | 0.08 | 0.2 | 0.4 | 0.05 | 0.08 | 6500 | 7.7 | 1.2E+11 | 6910 | very good |
| Sample 74 | 0 | 0.08 | 0.5 | 0.1 | 0.05 | 0.08 | 6140 | 8.1 | 1.1E+11 | 5980 | very good |
| Sample 75 | 0 | 0.08 | 0.6 | 0 | 0.05 | 0.08 | 7980 | 13.9 | 9.4E+10 | 6640 | poor |

With respect to 100 moles of the main component
first subcomponent: MgO 1.0 mol
second subcomponent: (Ba, Ca)SiO₃ 0.875 mol
third subcomponent: V₂O₅ 0.044 mol
fifth subcomponent: MnO 0.1 mol
Average particle diameter of the main component material: 0.30 μm
a thickness (interlayer thickness) of one dielectric layer = 3.5 μm
In the table, "mE + n" means "m × 10$^{+n}$"

Evaluation 8

From Table 8, when using same materials as in the example 3 as a material to be reacted in advance except for the main component material and materials to be added to the post-reaction material, the same results were obtained as in the example 3. Namely, when using $Yb_2O_3$ (the fourth (a) subcomponent) as a material to be reacted in advance, and $Y_2O_3$ (the fourth (a) subcomponent) and $Gd_2O_3$ (the fourth (b) subcomponent) as materials added to the post-reaction material, it was also confirmed to have high specific permittivity and preferable temperature characteristic of capacitance. However, in the sample wherein the $Y_2O_3$ amount to be reacted in advance was 0.6 mole (sample 75), it was confirmed that a dielectric loss (tan δ), IR and a temperature characteristic of capacitance were deteriorated while specific permittivity was high. Therefore, it was confirmed that the amounts of the fourth (a) subcomponent and/or the fourth (b) subcomponent to be reacted in advance with the main component material are preferably 0.5 mole or smaller that is the preferable range of the present invention.

Example 9

As with sample 63, $BaTiO_3$ and $BaZrO_3$ powders were used as the main component material, and $Tb_2O_3$ (the fourth (b) subcomponent) instead of $Yb_2O_3$ (the fourth (a) subcomponent) was used as a material to be reacted in advance with the main component material. Also, except for changing an amount of $Tb_2O_3$ (the fourth (b) subcomponent) to be reacted in advance and amounts of $Y_2O_3$ (the fourth (a) subcomponent) and $Gd_2O_3$ (the fourth (b) subcomponent) as materials added to the post-reaction material to values shown in Table 9 in terms of R1 and R2 respectively, each capacitor sample was obtained as with the example 1. The obtained respective samples were evaluated in the same way as in the example 7. The results are shown in Table 9.

Note that the ratio M2/M1 between number of moles M1 of R1 of the fourth (a) subcomponent and number of moles M2 of R2 of the fourth (b) subcomponent in the finally-obtained dielectric ceramic composition was in the range of 0.03 to 0.25 in Table 9.

Evaluation 9

From Table 9, when using same materials as in the example 5 as a material to be reacted in advance except for the main component material and materials to be added to the post-reaction material, the same results were obtained as in the example 5. Namely, when using the fourth (b) subcomponent instead of the fourth (a) subcomponent as a material to be reacted in advance, it was also confirmed to have preferable results. In addition, when the mole ratio of R1 and R2, M2/M1, was outside the range of the present invention (sample 84), it was confirmed that temperature characteristic of capacitance was liable to be deteriorated.

Example 10

As with sample 61, $BaTiO_3$, $CaTiO_3$ and $BaZrO_3$ powders were used as the main component material. Also, except for changing an amount of $Y_2O_3$ (the fourth (a) subcomponent) to be reacted in advance with the main component material and amounts of $Y_2O_3$ (the fourth (a) subcomponent) and $Gd_2O_3$ (the fourth (b) subcomponent) as materials added to the post-reaction material to values shown in Table 10 in terms of R1 and R2 respectively, each capacitor sample was obtained as with the example 1. The obtained respective samples were evaluated in the same way as in the example 7. The results are shown in Table 10.

Note that the ratio M2/M1 between number of moles M1 of R1 of the fourth (a) subcomponent and number of moles M2 of R2 of the fourth (b) subcomponent in the finally-obtained dielectric ceramic composition was 0.08 in Table 10.

TABLE 9

| Sample No. | Main Component $(Ba_{1-x}, Ca_x)(Ti_{1-y}, Zr_y)O_3$ x | y | Subcomponent Pre-adding 4th(b) (R2) Tb [mol] | Post-adding 4th(a) (R1) Y [mol] | Post-adding 4th(b) (R2) Gd [mol] | Mole Ratio of R1 & R2 M2/M1 | Specific Permittivity ε | tan δ [%] | IR [Ω·m] | CR Product [μF·MΩ] | Temperature Characteristic (X6S) |
|---|---|---|---|---|---|---|---|---|---|---|---|
| Sample 81 | 0 | 0.08 | 0 | 0.6 | 0.05 | 0.08 | 5300 | 5.7 | 1.3E+11 | 6290 | very good |
| Sample 82 | 0 | 0.08 | 0.05 | 0.6 | 0.05 | 0.17 | 7320 | 7.1 | 1.2E+11 | 7780 | very good |
| Sample 83 | 0 | 0.08 | 0.1 | 0.6 | 0.05 | 0.25 | 7300 | 7.0 | 1.2E+11 | 7760 | very good |
| Sample 84 | 0 | 0.08 | 0.2 | 0.6 | 0.05 | 0.42 | 6460 | 8.5 | 1.1E+11 | 6290 | poor |

With respect to 100 moles of the main component
first subcomponent: MgO 1.0 mol
second subcomponent: (Ba, Ca)$SiO_3$ 0.875 mol
third subcomponent: $V_2O_5$ 0.044 mol
fifth subcomponent: MnO 0.1 mol
Average particle diameter of the main component material: 0.30 μm
a thickness (interlayer thickness) of one dielectric layer = 3.5 μm
In the table, "mE + n" means "m × $10^{+n}$"

TABLE 10

| Sample No. | Main Component $(Ba_{1-x}Ca_x)(Ti_{1-y}Zr_y)O_3$ x | Main Component $(Ba_{1-x}Ca_x)(Ti_{1-y}Zr_y)O_3$ y | Subcomponent Pre-adding 4th(a) (R1) Y [mol] | Subcomponent Post-adding 4th(a) (R1) Y [mol] | Subcomponent Post-adding 4th(b) (R2) Gd [mol] | Mole Ratio of R1 & R2 M2/M1 | Specific Permittivity ε | tan δ [%] | IR [Ω·m] | CR Product [μF·MΩ] | Temperature Characteristic (X6S) |
|---|---|---|---|---|---|---|---|---|---|---|---|
| Sample 61 | 0.04 | 0.1 | 0.1 | 0.5 | 0 | 0 | 9240 | 6.5 | 1.5E+11 | 12270 | very good |
| Sample 91 | 0.04 | 0.1 | 0.1 | 0.5 | 0.02 | 0.03 | 9510 | 6.6 | 1.4E+11 | 11790 | very good |
| Sample 92 | 0.04 | 0.1 | 0.1 | 0.5 | 0.05 | 0.08 | 10200 | 6.8 | 1.4E+11 | 12640 | very good |
| Sample 93 | 0.04 | 0.1 | 0.1 | 0.5 | 0.075 | 0.13 | 11000 | 6.7 | 1.5E+11 | 14600 | very good |
| Sample 94 | 0.04 | 0.1 | 0.1 | 0.5 | 0.1 | 0.17 | 9850 | 6.7 | 1.3E+11 | 11340 | very good |
| Sample 95 | 0.04 | 0.1 | 0.1 | 0.5 | 0.125 | 0.21 | 9600 | 6.6 | 1.2E+11 | 10200 | very good |
| Sample 96 | 0.04 | 0.1 | 0.1 | 0.5 | 0.15 | 0.25 | 8100 | 6.5 | 1.2E+11 | 8600 | good |

With respect to 100 moles of the main component
first subcomponent: MgO 1.0 mol
second subcomponent: (Ba, Ca)SiO$_3$ 0.875 mol
third subcomponent: V$_2$O$_5$ 0.044 mol
fifth subcomponent: MnO 0.1 mol
Average particle diameter of the main component material: 0.30 μm
a thickness (interlayer thickness) of one dielectric layer = 3.5 μm
In the table, "mE + n" means "m × 10$^{+n}$"

Evaluation 10

From Table 10, when using same materials as in the example 4 as a material to be reacted in advance except for the main component material and materials to be added to the post-reaction material, the same results were obtained as in the example 4. Namely, it was confirmed that the change in the amount of the fourth (b) subcomponent material added to the post-reaction material resulted in preferable specific permittivity as well as preferable other characteristics such as temperature characteristic of capacitance and IR. Also, when the mole ratio of R1 and R2, M2/M1, was within the range of the present invention, it was confirmed that characteristics such as specific permittivity and temperature characteristic of capacitance were preferable. Note that the sample 96 did not satisfy the X6S characteristics, but the deviation was very small.

What is claimed is:

1. A production method of a dielectric ceramic composition comprising
a main component including a compound having a perovskite-type crystal structure expressed by a composition formula $(Ba_{1-x}Ca_x)(Ti_{1-y}Zr_y)O_3$, wherein $0 \leq x \leq 0.2$, $0 \leq y \leq 0.2$, a fourth (a) subcomponent including an oxide of R1, wherein R1 is at least one selected from the group consisting of rare-earth elements having an effective ionic radius for coordination number 9 of less than 108 pm, and
a fourth (b) subcomponent including an oxide of R2, wherein R2 is at least one selected from the group consisting of rare-earth elements having an effective ionic radius for coordination number 9 of 108 pm to 113 pm; comprising steps of:
obtaining a post-reaction material by bringing a material of said main component to react with a part of a material of said fourth (a) subcomponent and/or a part of a material of said fourth (b) subcomponent to be included in said dielectric ceramic composition in advance of a step of firing;
obtaining a material of said dielectric ceramic composition by adding rest of materials of said fourth (a) subcomponent and said fourth (b) subcomponent to be included in said dielectric ceramic composition into said post-reaction material; and
firing said material of said dielectric ceramic composition, wherein a ratio (M2/M1) of number of moles M2 of R2 of said fourth (b) subcomponent to number of moles M1 of R1 of said fourth (a) subcomponent in said dielectric ceramic composition to be obtained finally satisfies $0.03 \leq M2/M1 \leq 0.25$,
wherein in said step for obtaining the post-reaction material, a content of said fourth (a) subcomponent and/or said fourth (b) subcomponent to be brought to react with the materials of said main component is 0.05 to 0.4 mole in terms of R1 and/or R2 with respect to 100 moles of said main component.

2. The production method of a dielectric ceramic composition as set forth in claim 1, wherein said post-reaction material is obtained by solid state reaction between the material of said main component and the part of the material of said fourth (a) subcomponent and/or the part of the material of said fourth (b) subcomponent to be included in said dielectric ceramic composition.

3. The production method of a dielectric ceramic composition as set forth in claim 1, wherein
a content of said fourth (a) subcomponent in said dielectric ceramic composition to be obtained finally is more than 0 to 10 moles in terms of R1 with respect to 100 moles of said main component, and
a content of said fourth (b) subcomponent in said dielectric ceramic composition to be obtained finally is more than 0 to 2 moles in terms of R2 with respect to 100 moles of said main component.

4. The production method of a dielectric ceramic composition as set forth in claim 1, wherein, when an effective ionic radius for coordination number 9 of rare earth elements composing said R1 is r1 and an effective ionic radius for coordination number 9 of rare earth elements composing said R2 is r2, said R1 and said R2 are selected so that a ratio (r2/r1) of r1 and r2 satisfies a relationship of $1.007 < r2/r1 < 1.06$.

5. The production method of a dielectric ceramic composition as set forth in claim 1, wherein said R1 is at least one selected from the group consisting of Y, Ho, Er, Tm, Yb and Lu.

6. The production method of a dielectric ceramic composition as set forth in claim 1, wherein said R2 is at least one selected from the group consisting of Dy, Tb, Gd and Eu.

7. The production method of a dielectric ceramic composition as set forth in claim 1, wherein
said dielectric ceramic composition furthermore comprises
a first subcomponent including at least one selected from the group consisting of MgO, CaO, BaO and SrO,
a second subcomponent including mainly $SiO_2$ and at least one selected from the group consisting of MO, $Li_2O$ and $B_2O_3$, wherein M is at least one selected from the group consisting of Mg, Ca, Ba and Sr, and
a third subcomponent including at least one selected from the group consisting of $V_2O_5$, $MoO_3$ and $WO_3$; and
ratios of the respective subcomponents with respect to 100 moles of said main component are
the first subcomponent: 0.1 to 5 moles,
the second subcomponent: 0.1 to 12 moles, and
the third subcomponent: more than 0 to 0.3 mole.

8. The production method of a dielectric ceramic composition as set forth in claim 7, wherein
said dielectric ceramic composition furthermore comprises a fifth subcomponent including MnO and/or $Cr_2O_3$, and
a ratio of the fifth subcomponent with respect to 100 moles of said main component is 0.05 to 1.0 mole.

* * * * *